United States Patent
Jenkins

(10) Patent No.: US 7,667,762 B2
(45) Date of Patent: Feb. 23, 2010

(54) DUAL SENSOR VIDEO CAMERA

(75) Inventor: Michael V. Jenkins, Buda, TX (US)

(73) Assignee: LifeSize Communications, Inc., Austin, TX (US)

( * ) Notice: Subject to any disclaimer, the term of this patent is extended or adjusted under 35 U.S.C. 154(b) by 450 days.

(21) Appl. No.: 11/461,635

(22) Filed: Aug. 1, 2006

(65) Prior Publication Data

US 2008/0030611 A1   Feb. 7, 2008

(51) Int. Cl.
- H04N 9/09 (2006.01)
- H04N 9/093 (2006.01)
- H04N 9/07 (2006.01)

(52) U.S. Cl. ............. 348/362; 348/263; 348/264; 348/267

(58) Field of Classification Search ............ 348/239, 348/218.1, 321, 336–345, 238, 236, 262, 348/443, 444, 450, 263, 264, 266, 267; 382/154, 382/162, 167, 184, 287

See application file for complete search history.

(56) References Cited

U.S. PATENT DOCUMENTS

| | | | |
|---|---|---|---|
| 4,264,928 A | | 4/1981 | Schober |
| 4,876,591 A | * | 10/1989 | Muramatsu ............ 348/236 |
| 5,038,216 A | | 8/1991 | Easterly et al. |
| 5,081,525 A | * | 1/1992 | Akiyama et al. ........ 348/263 |
| 5,347,599 A | | 9/1994 | Yamashita et al. |
| 5,374,971 A | | 12/1994 | Clapp et al. |
| 5,379,069 A | * | 1/1995 | Tani ................ 348/333.11 |
| 5,486,853 A | | 1/1996 | Baxter et al. |
| 5,515,099 A | | 5/1996 | Cortjens et al. |
| 5,528,274 A | | 6/1996 | Hyodo |
| 5,528,289 A | | 6/1996 | Cortjens et al. |
| 5,537,157 A | | 7/1996 | Washino et al. |
| 5,579,053 A | | 11/1996 | Pandel |
| 5,598,209 A | | 1/1997 | Cortjens et al. |
| 5,612,733 A | | 3/1997 | Flohr |
| 5,617,539 A | | 4/1997 | Ludwig et al. |
| 5,629,734 A | | 5/1997 | Hamilton et al. |
| 5,633,681 A | | 5/1997 | Baxter et al. |
| 5,661,525 A | | 8/1997 | Kovacevic et al. |
| 5,689,641 A | | 11/1997 | Ludwig et al. |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

Primary Examiner—Tuan Ho
Assistant Examiner—Marly Camargo
(74) Attorney, Agent, or Firm—Meyertons Hood Kivlin Kowert & Goetzel, P.C.; Jeffrey C. Hood; Jason L. Burgess

(57) ABSTRACT

Various embodiments of a dual-sensor video camera are disclosed. The dual-sensor video camera includes a color filter array (CFA) sensor, which has a low-pass filter. The dual-sensor video camera also includes a panchromatic sensor. A beam splitter directs an incoming light beam to both sensors. An output image is produced based on image information from the two sensors. The output image includes luminance information based on the image information from the panchromatic sensor and chrominance information based on the image information from the CFA sensor.

16 Claims, 6 Drawing Sheets

U.S. PATENT DOCUMENTS

| | | | |
|---|---|---|---|
| 5,692,159 | A | 11/1997 | Shand |
| 5,751,338 | A | 5/1998 | Ludwig, Jr. |
| 5,821,987 | A | 10/1998 | Larson |
| 5,832,143 | A | 11/1998 | Suga et al. |
| 6,072,522 | A | 6/2000 | Ippolito et al. |
| 6,100,929 | A * | 8/2000 | Ikeda et al. ............... 348/262 |
| 6,266,093 | B1 * | 7/2001 | Glenn ...................... 348/448 |
| 6,356,308 | B1 | 3/2002 | Hovanky |
| 6,373,523 | B1 * | 4/2002 | Jang ........................ 348/273 |
| 6,563,537 | B1 | 5/2003 | Kawamura et al. |
| 6,594,688 | B2 | 7/2003 | Ludwig et al. |
| 6,639,626 | B1 * | 10/2003 | Kubo et al. ............. 348/218.1 |
| 6,643,462 | B2 | 11/2003 | Harand et al. |
| 6,724,619 | B2 | 4/2004 | Kwong et al. |
| 6,731,334 | B1 | 5/2004 | Maeng et al. |
| 6,809,358 | B2 | 10/2004 | Hsieh et al. |
| 6,816,904 | B1 | 11/2004 | Ludwig et al. |
| 6,850,265 | B1 | 2/2005 | Strubbe et al. |
| 6,965,705 | B1 | 11/2005 | Ma et al. |
| 6,980,485 | B2 | 12/2005 | McCaskill |
| 6,993,179 | B1 * | 1/2006 | Weinshall et al. ........... 382/154 |
| 7,035,481 | B2 | 4/2006 | Kim et al. |
| 7,038,709 | B1 | 5/2006 | Verghese |
| 7,046,295 | B2 | 5/2006 | Hovanky |
| 7,057,647 | B1 * | 6/2006 | Monroe ................... 348/217.1 |
| 7,088,391 | B2 * | 8/2006 | Glenn et al. ............... 348/262 |
| 7,088,392 | B2 | 8/2006 | Kakarala et al. |
| 7,202,904 | B2 | 4/2007 | Wei |
| 2003/0151685 | A1 * | 8/2003 | Ia Grone .................... 348/262 |
| 2004/0001137 | A1 | 1/2004 | Cutler et al. |
| 2004/0183897 | A1 | 9/2004 | Kenoyer et al. |
| 2006/0082676 | A1 | 4/2006 | Jenkins et al. |
| 2006/0119710 | A1 * | 6/2006 | Ben-Ezra et al. ....... 348/208.99 |
| 2006/0262333 | A1 | 11/2006 | Jenkins |
| 2007/0139517 | A1 | 6/2007 | Jenkins |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Peter Meyers; "Adding Eye Contact to Your Web Chats"; The New York Times; Sep. 4, 2003; 5 pages.

"Polycom Executive Collection"; Jun. 2003; 4 pages.; Polycom, Inc.; Pleasanton, CA.

Joe Duran and Charlie Sauer; "Mainstream Videoconferencing—A Developer's Guide to Distance Multimedia"; Jan. 1997; pp. 103-105; Addison Wesley Longman, Inc.

* cited by examiner

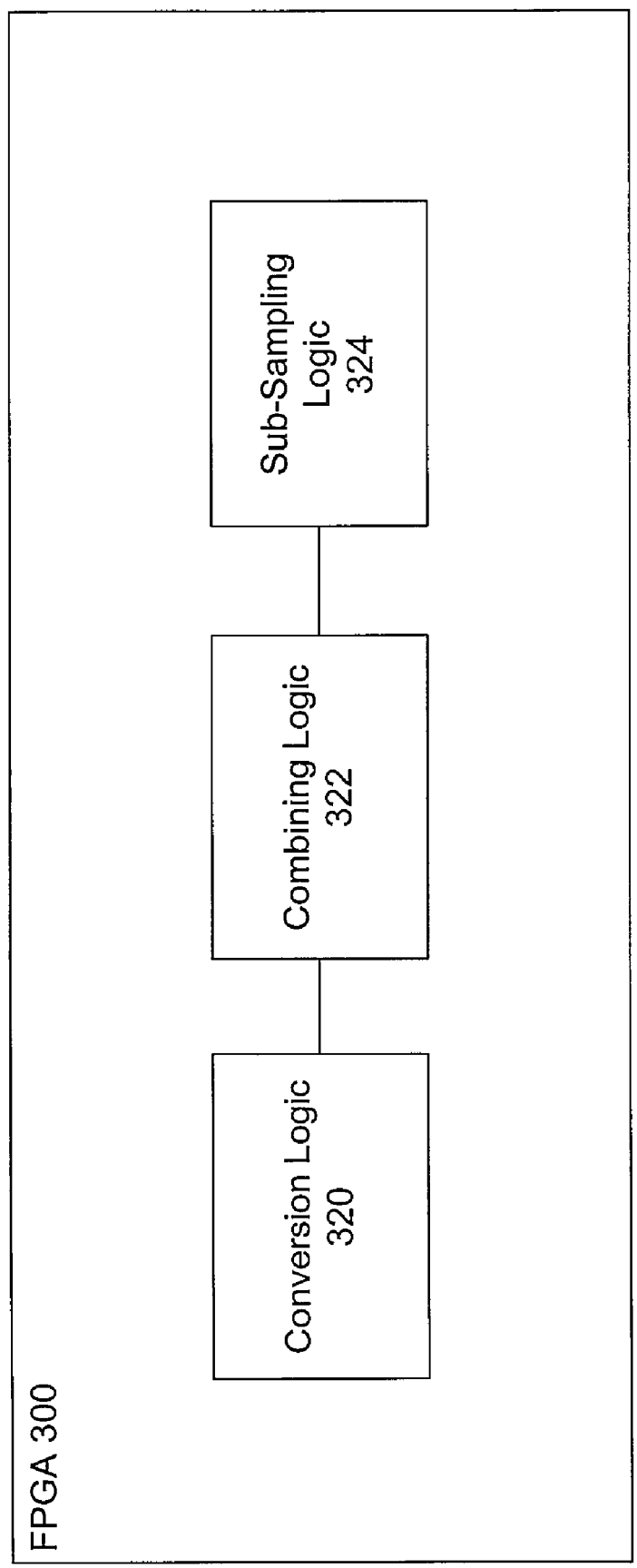

6 Pixels
4 Pixels

DUAL SENSOR VIDEO CAMERA

BACKGROUND OF THE INVENTION

1. Field of the Invention

The present invention relates to digital video cameras. More particularly, the invention relates to a dual sensor video camera including a panchromatic sensor and a color filter array (CFA) sensor.

2. Description of the Related Art

Digital video cameras utilize sensors that capture light from a scene and produce digital information representing images of the scene. The sensors have a large number of sensor sites that each capture light from a particular point within the scene, which is represented as a corresponding pixel in the digital image.

Two basic types of digital video cameras are known in the art: single sensor cameras and 3-sensor cameras. The sensor in a single sensor camera is typically overlaid with an alternating pattern (e.g., Bayer pattern) of color filters referred to as a color filter array (CFA). The color filter array typically comprises a pattern of red color filters, green color filters, and blue color filters, where each color filter is aligned over one of the sensor sites. Thus, the color filter over each sensor site filters either the red, green, or blue component of the light falling onto it so that each sensor site effectively captures either red, green, or blue color information.

A process called demosaicing or CFA interpolation is used to estimate the missing color components for each pixel in the image. For example, if a particular sensor site is overlaid with a red color filter so that it captures the red color component then the demosaicing algorithm estimates the green and blue color components for the corresponding pixel based on the green and blue color components measured by surrounding sensor sites that are overlaid with green and blue color filters.

The demosaicing process works quite well for many images. However, in some images, a problem called color aliasing occurs. For example, in an image with a lot of high frequency information (fine detail), the color information can change as fast as every pixel. In this situation the demosaicing algorithm has difficulty making appropriate estimates as to the missing color components for each pixel, with the result that spurious colors appear in the image.

One approach to this problem has been to overlay a low-pass filter over the sensor. A low-pass filter limits how quickly the image information can change. This solves the problem of color aliasing but destroys fine detail and makes all images fuzzier, whether they suffered from visible color aliasing or not.

The other type of video camera, the 3-sensor camera, uses a beam splitter to split the light into three light beams that are sent to three different sensors. One sensor is overlaid with a red color filter, one is overlaid with a green color filter, and one is overlaid with a blue color filter. The red, green, and blue color components of the image pixels are obtained from the corresponding sensor sites of the respective sensors.

This approach provides a very high quality result with no color aliasing. However, one problem with 3-sensor cameras is the cost and complexity involved in their production. For example, the three sensors are typically precisely mechanically aligned with each other so that their respective sensor sites correspond to the same pixels in the image, which adds manufacturing cost. Also, since the beam splitter splits light into three separate beams, the amount of light that reaches each sensor is reduced. The reduction in light to the sensors results in a lowered signal-to-noise ratio and effectively adds dynamic noise to the image.

Both single sensor and 3-sensor video cameras typically convert the image from RGB 4:4:4 format to an industry standard YCbCr 4:2:2 format.

SUMMARY

Various embodiments of a dual-sensor video camera are disclosed. The dual-sensor video camera includes a color filter array (CFA) sensor, i.e., a sensor overlaid with a color filter array. The CFA sensor includes a low-pass filter. The dual-sensor video camera also includes a panchromatic sensor, also referred to as a monochrome sensor.

The dual-sensor video camera also includes a beam splitter configured to split an incoming light beam into two beams, where one of the beams is directed to the CFA sensor and the other beam is directed to the panchromatic sensor.

The dual-sensor video camera also includes one or more computational elements, such as one or more processors or one or more programmable hardware elements, such as an FPGA. The one or more computational elements are operable to receive first image information from the panchromatic sensor and second image information from the CFA sensor and produce an output image from the first image information and the second image information. The output image includes luminance information based on the first image information from the panchromatic sensor and chrominance information based on the second image information from the CFA sensor.

BRIEF DESCRIPTION OF THE DRAWINGS

A better understanding of the present invention may be obtained when the following detailed description is considered in conjunction with the following drawings, in which:

FIG. 3 illustrates an exemplary FPGA device of the dual-sensor video camera, where the FPGA device is configured to perform the method of FIG. 2.

Figure 1:
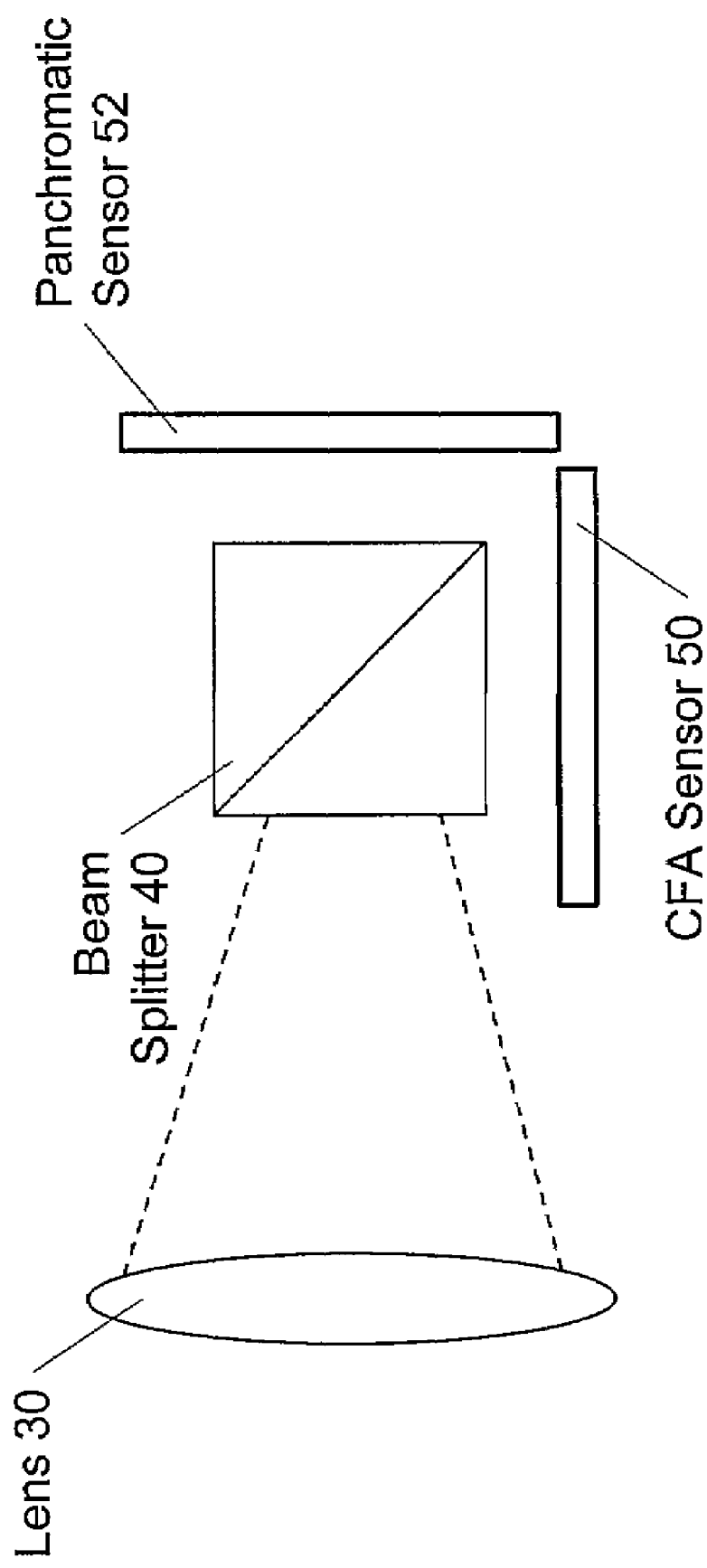
FIG. 1 illustrates one exemplary embodiment of a dual-sensor video camera.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a dual-sensor digital video camera are described herein. One of the sensors comprises a color filter array (CFA) sensor, i.e., a sensor overlaid with a color filter array. The color filter array comprises an alternating pattern of color filters, where each color filter is aligned over one of the sensor sites. The CFA sensor is also overlaid with a low-pass filter for preventing or reducing color aliasing, as described above. The other sensor comprises a panchromatic sensor, also referred to as a monochrome sensor. The panchromatic sensor is not overlaid with color filters, and thus, the light falling onto its sensor sites includes all color components. Also, the panchromatic sensor is not overlaid with a low-pass filter. As described below, the dual-sensor video camera produces images based on the image information from both the CFA sensor and the panchromatic sensor.

FIG. 1 illustrates the two sensors in an exemplary embodiment of the dual-sensor video camera. As shown, the dual-sensor video camera includes a lens 30 through which an incoming light beam passes onto a beam splitter 40. The beam splitter 40 comprises a device operable to split the incoming light beam into two beams. One of the beams is directed to the CFA sensor 50, and the other beam is directed to the panchromatic sensor 52.

In various embodiments, the beam splitter 40 may be configured to send the two light beams at various angles with respect to each other. Thus, the CFA sensor 50 and the panchromatic sensor 52 may be mechanically arranged in various ways within the dual-sensor video camera and at various angles with respect to each other. In the embodiment illustrated in FIG. 1, the two sensors are arranged at roughly a 90-degree angle with respect to each other.

Also, in various embodiments, the beam splitter 40 may be configured to direct different amounts of light to the two sensors. In other words, the two light beams into which the incoming light beam is split may have various intensities with respect to each other. In particular, in some embodiments, the beam splitter 40 may direct a majority of the light to the panchromatic sensor 52 so that it receives more light than the CFA sensor 50.

The CFA sensor 50 produces image information from the light beam that it receives, e.g., where the image information indicates the amount of light received by each of its sensor sites. Similarly, the panchromatic sensor 52 also produces image information indicating the amount of light received by each of its sensor sites. The image information produced by the CFA sensor 50 is also referred to herein as CFA image information, and the image information produced by the panchromatic sensor 52 is referred to herein as panchromatic image information.

The dual-sensor video camera is operable to produce an output image based on both the CFA image information and the panchromatic image information. For example, the dual-sensor video camera may include one or more computational elements operable to combine the CFA image information and the panchromatic image information to produce the output image. More particularly, the resulting output image may comprise chrominance information (but not luminance information) from the CFA image information and luminance information (but not chrominance information) from the panchromatic image information, as described in more detail below.

Figure 2:
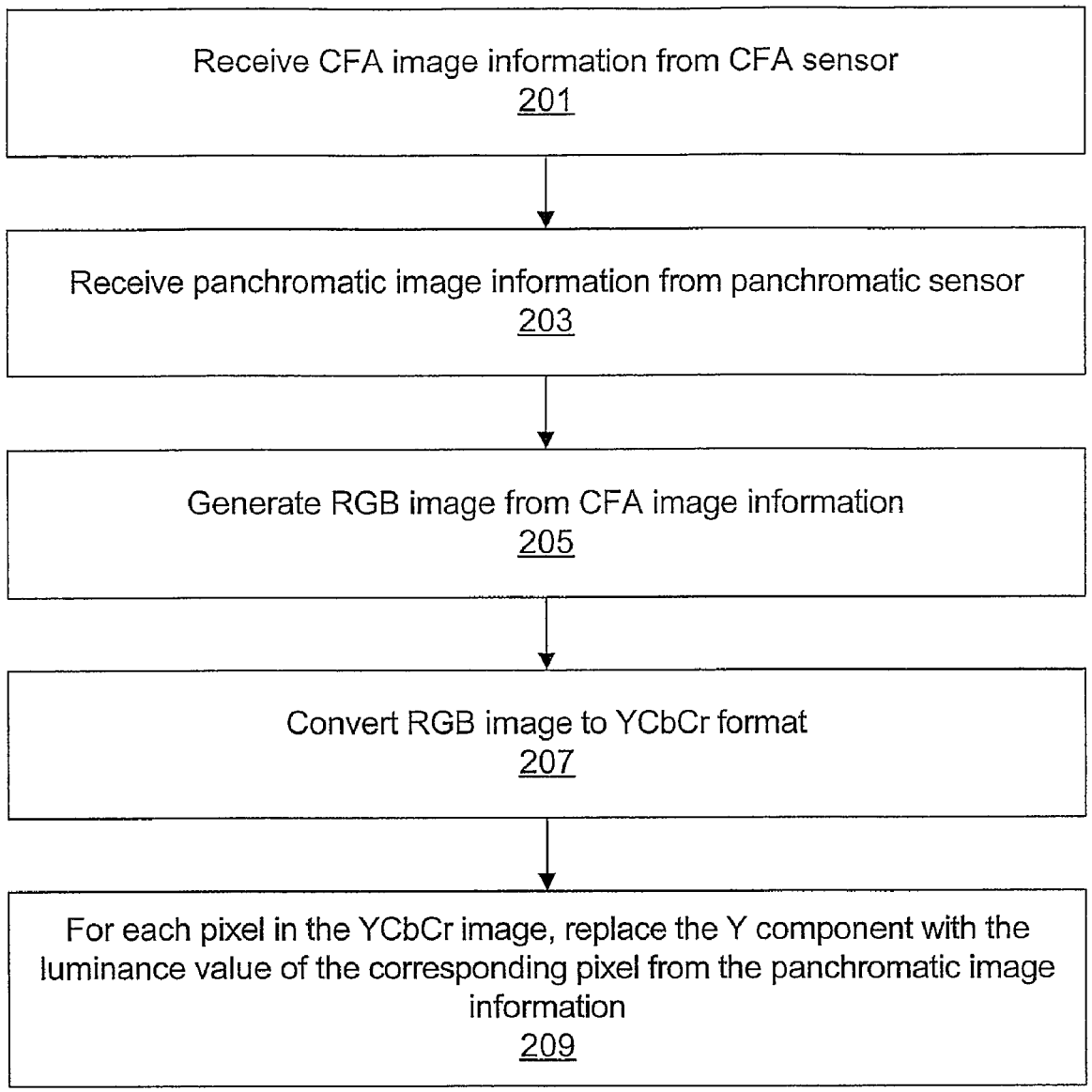
FIG. 2 is a flowchart diagram illustrating one embodiment of a method for producing an output image from the image information produced by the two sensors of the dual-sensor video camera.

Referring now to FIG. 2, a flowchart diagram illustrating one embodiment of a method for producing an output image from the image information produced by the two sensors is illustrated. The method may be implemented by one or more computational elements in the dual-sensor video camera, such as one or more processors or programmable hardware elements (e.g., FPGAs).

As indicated in blocks 201 and 203, respectively, the CFA image information may be received from the CFA sensor 50, and the panchromatic image information may be received from the panchromatic sensor 52. For example, the computational element(s) may be coupled to the CFA sensor 50 and the panchromatic sensor 52 such that it receives the image information from the respective sensors.

As indicated in 205, the computational element(s) may generate an RGB image from the CFA image information received from the CFA sensor 50. The RGB information may comprise an RGB representation of the CFA image information. As described above, generating the RGB image information may comprise performing a demosaicing algorithm to estimate color components of the image pixels.

In 207, the RGB image may be converted to YCbCr format, i.e., may be converted to a YCbCr representation of the RGB image. As known in the art, each pixel in the YCbCr image comprises three components (Y, Cb, Cr), where the Y component is the luminance (brightness) component, and the Cb and Cr components are chroma components.

The panchromatic image information comprises monochrome image information, e.g., simply indicates the luminance value of each pixel in the image. As indicated in 209, the computational element(s) may produce an output image based on the panchromatic image information and the YCbCr image generated in 207 by replacing the Y component (luminance component) of each pixel in the YCbCr image with the luminance value of the corresponding pixel from the panchromatic image.

For example, suppose that the pixels in the YCbCr image are represented as follows: $[Y_{C1}, Cb_1, Cr_1]$, $[Y_{C2}, Cb_2, Cr_2]$, ... $[Y_{CN}, Cb_N, Cr_N]$. And suppose that the corresponding pixels in the panchromatic image are represented as follows: $[Y_{P1}], [Y_{P2}], \ldots [Y_{PN}]$. Thus, the output image generated in 209 may comprise a YCbCr image represented as: $[Y_{P1}, Cb_1, Cr_1], [Y_{P2}, Cb_2, Cr_2], \ldots [Y_{PN}, Cb_N, Cr_N]$.

Thus, the luminance information for the resulting output image comes from the panchromatic image information from the panchromatic sensor 52, and the chrominance (e.g., hue and saturation) information comes from the CFA image information from the CFA sensor 50. As noted above, the CFA sensor 50 includes a low-pass filter. Since the CFA image information is low-pass filtered, color aliasing is reduced or eliminated in the output image. Moreover, human vision perceives image sharpness primarily based on luminance information. Thus, since the luminance information for the resulting output image comes from the panchromatic image information, which has not been low-pass filtered, the output image may be perceptibly sharper and less fuzzy than in traditional single-sensor video cameras.

The dual-sensor video camera may also have advantages over traditional 3-sensor video cameras. For example, the dual-sensor video camera may be less expensive to produce, since it uses two sensors instead of three. Also, as described in more detail below, some embodiments may utilize an electronic alignment technique to align pixels in the two sensors instead of relying on precise mechanical alignment, which may also reduce the manufacturing cost. Also, as noted above, in some embodiments the beam splitter 40 may direct a majority of the light from the incoming light beam to the panchromatic sensor 52. This may result in an increased signal-to-noise ratio in the luminance component of the output image (possibly at the expense of a decreased signal-to-noise ratio in the chrominance components, where those errors are less visible in human vision).

It is noted that FIG. 2 represents one exemplary embodiment of a method for generating an output image from the CFA image information and the panchromatic image information, and numerous alternative embodiments are contemplated. In general, the dual-sensor video camera may be operable to combine the CFA image information and the panchromatic image information in any of various ways in order to generate an output image in which the luminance information comes from the panchromatic image information and the chrominance information comes from the CFA image information.

It is noted that the YCbCr output image generated in 209 may be further processed. For example, in a typical embodiment, the YCbCr image may be sub-sampled down to YCbCr 4:2:2 format, which is a common output format used in digital video cameras. It is also noted that in alternative embodiments the dual-sensor video camera may be operable to produce an output image in an image format or color space other than YCbCr. In general, similar techniques as described above may be applied to generate any of various types of output images in which luminance information is represented separately from chrominance information.

In various embodiments, the dual-sensor video camera may include one or more computational elements of any kind operable to produce the output image based on the image information from the two sensors. For example, the dual-sensor video camera may include one or more processors and/or one or more programmable hardware elements operable to produce the output image. Examples of programmable hardware elements include reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

FIG. 3 illustrates an exemplary FPGA device 300 configured to perform the method of FIG. 2. It is noted that FIG. 3 represents one exemplary embodiment, and in other embodiments the dual-sensor video camera may include other types of computational elements configured in various other ways.

As shown, the FPGA device 300 includes conversion logic 320. The conversion logic 320 may comprise a portion of the FPGA device 300 (e.g., a subset of its resources, such as memory, gates, multipliers, or other programmable logic elements) configured to convert images from one format to another, e.g., as described above with reference to blocks 205 and 207. For example, the conversion logic 320 may be operable to generate the RGB image from the CFA image information and may convert the RGB image to YCbCr format.

The exemplary FPGA device 300 also includes combining logic 322. The combining logic 322 may comprise a portion of the FPGA device configured to combine the panchromatic image information with the YCbCr image generated in 207, e.g., by replacing the Y component values with luminance values based on the panchromatic image information, as described above.

The exemplary FPGA device 300 also includes sub-sampling logic 324. The sub-sampling logic 324 may comprise a portion of the FPGA device configured to sub-sample the YCbCr output image generated in 209 down to YCbCr 4:2:2 format, or may perform any of various other types of re-sampling.

The method of FIG. 2 involves replacing the luminance components of pixels in the YCbCr image generated from the CFA image information with luminance values from corresponding pixels in the panchromatic image. Thus, it is necessary to know how pixels in the two images correspond to each other. In one embodiment the manufacturing process for the dual-sensor video camera may comprise mechanically aligning the CFA sensor 50 and the panchromatic sensor 52 very precisely so that pixels in the same position in the two images correspond to each other. For example, a pixel for a sensor site at row X and column Y in one sensor would correspond exactly to the pixel for the sensor site at row X and column Y in the other sensor.

In another embodiment, the two sensors may be aligned with each other to within a certain tolerance, but may not necessarily be aligned so precisely that pixels in the exact same position in the two images correspond to each other. In this embodiment, the slight difference in alignment may be compensated for electronically. For example, during the manufacturing process, images generated by the two sensors may be compared to each other to determine the difference in alignment, and information indicating the alignment difference may be stored in a memory medium of the dual-sensor video camera. The computational element(s) may use this information to determine which pixel in the panchromatic image corresponds to a given pixel in the YCbCr image generated from the CFA image information. (The sensors used in the dual-sensor video camera may have slightly more rows and columns than needed in the final image, in order to take the possible alignment differences into account.)

Figure 4A:
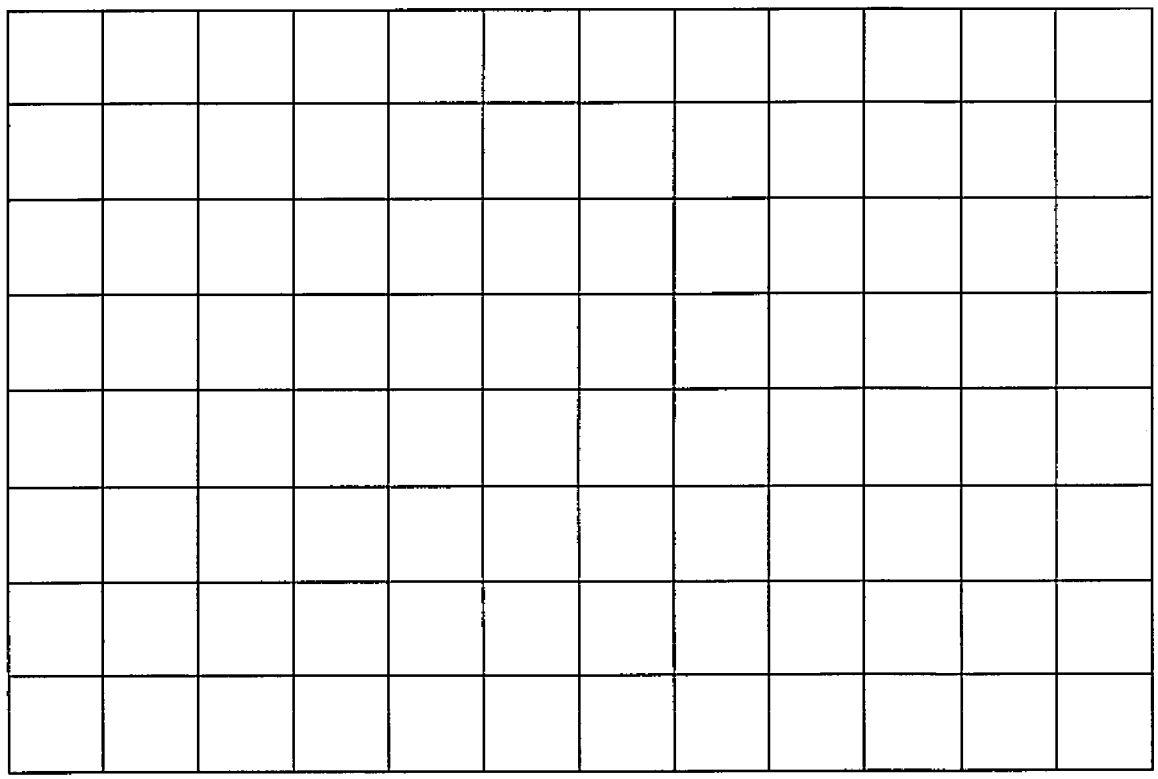
FIGS. 4A-4C illustrate a technique for electronically aligning images produced by the two sensors of the dual-sensor video camera.
Figure 4B:
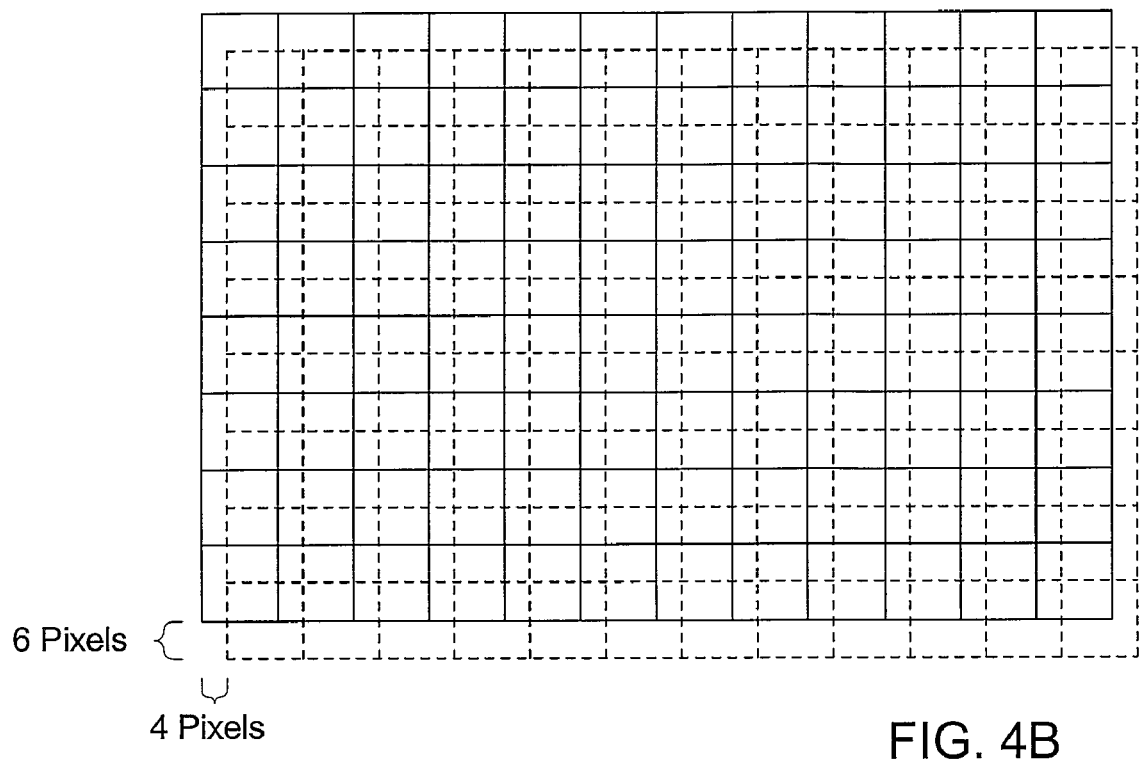

For example, suppose that the dual-sensor video camera is aimed at a scene which produces an image pattern such as shown in FIG. 4A. If the two sensors are not exactly aligned then the corresponding pixels in the two images may be shifted horizontally and/or vertically with respect to each other. For example, FIG. 4B illustrates an example in which there is a horizontal difference of 4 pixels and a vertical difference of 6 pixels.

Thus, the manufacturing process for the dual-sensor video camera may comprise aiming the dual-sensor video camera at a target and analyzing the target images produced by the two sensors in order to determine the horizontal and vertical alignment differences. For example, the camera may be pointed at a target with a black dot in the upper left corner, and the pixels in each image may be read in order to determine the difference in where the black dot falls in each image. The horizontal and vertical difference values may be stored in a memory medium of the dual-sensor video camera and used by the computational element(s) in order to determine that corresponding pixels are shifted horizontally and vertically with respect to each other by the indicated number of pixels.

Figure 4C:
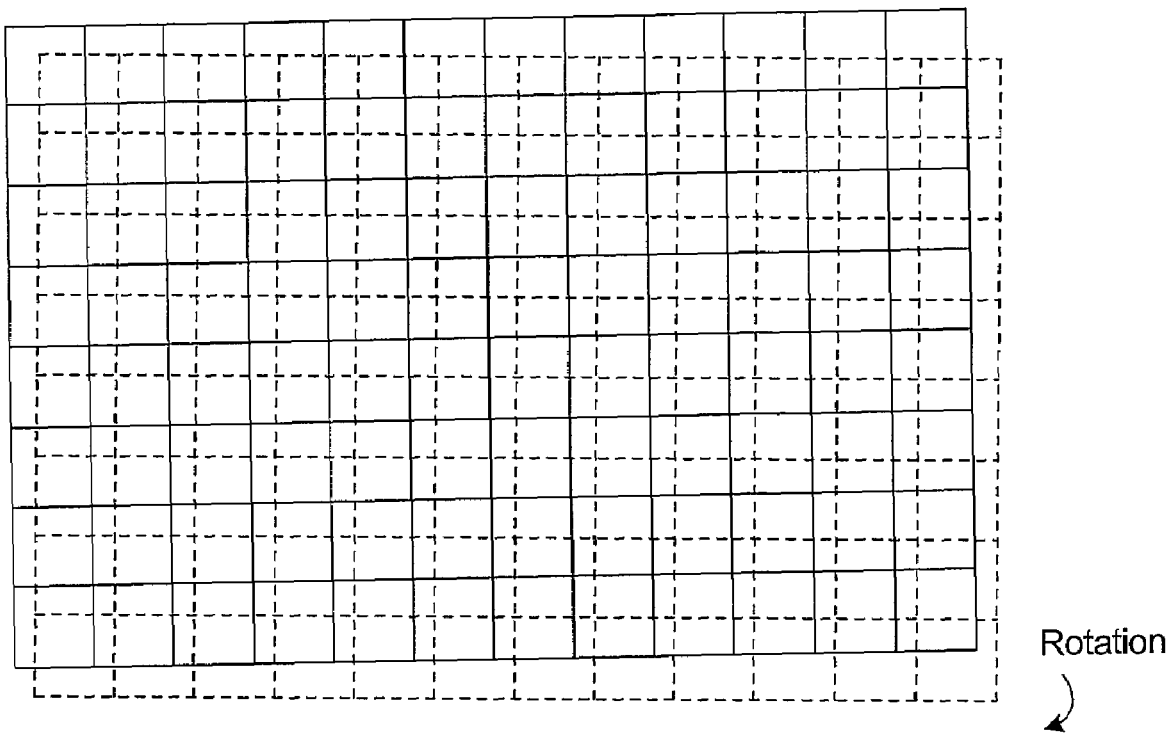

Similarly, the corresponding pixels in the two images may also be rotated with respect to each other, e.g., as illustrated in FIG. 4C. Thus, the manufacturing process for the dual-sensor video camera may also analyze the target images produced by the two sensors in order to determine the rotational difference. For example, in addition to the black dot, the target image may also have a horizontal line. The target images from the two sensors may be analyzed in order to determine how to make the horizontal lines in the images align, e.g., by determining how many pixels to move horizontally along the line before shifting up or down one pixel. Information indicating the rotational difference may be stored in the memory of the dual-sensor video camera, and the computational element(s) may take the rotational difference into account when determining how the pixels within the two images correspond to each other.

Utilizing an electronic alignment technique to electronically align pixels in the two images in this manner may enable the manufacturing cost to be reduced compared to traditional precision alignment techniques.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A dual-sensor digital video camera comprising:
   a panchromatic sensor;
   a color filter array (CFA) sensor including a low-pass filter; and a beam splitter;
wherein the beam splitter is configured to split a beam of light into a first beam directed to the panchromatic sensor and a second beam directed to the CFA sensor;
wherein the panchromatic sensor produces first image information from the first beam;
wherein the CFA sensor produces second image information from the second beam;
wherein the dual-sensor digital video camera further comprises a memory medium storing alignment difference information indicating an alignment difference between the panchromatic sensor and the CFA sensor;
wherein the dual-sensor digital video camera further comprises one or more computational elements configured to:
determine a first plurality of pixels representing the first image information, wherein each pixel of the first plurality of pixels includes luminance information;
determine a second plurality of pixels representing the second image information, wherein each pixel of the second plurality of pixels includes luminance information and chrominance information;
produce a digital output signal including a third plurality of pixels, wherein the one or more computational elements are configured to produce each respective pixel of the third plurality of pixels by:
including in the respective pixel the luminance information of a particular pixel of the first plurality of pixels;
using the alignment difference information to determine a particular pixel of the second plurality of pixels that corresponds to the particular pixel of the first plurality of pixels; and
including in the respective pixel the chrominance information of the particular pixel of the second plurality of pixels.

2. The dual-sensor digital video camera of claim 1,
wherein the beam splitter is configured to direct more light to the panchromatic sensor than to the CFA sensor.

3. The dual-sensor digital video camera of claim 1, wherein the one or more computational elements comprise one or more of:
a processor; and/or
an FPGA.

4. The dual-sensor digital video camera of claim 1,
wherein the low-pass filter of the CFA sensor reduces color aliasing; and
wherein using the first image information from the panchromatic sensor for the luminance information of the digital output signal results in improved image sharpness.

5. The dual-sensor digital video camera of claim 1, wherein the panchromatic sensor is not configured with a low-pass filter.

6. The dual-sensor digital video camera of claim 1,
wherein the alignment difference information stored on the memory medium includes:
horizontal alignment difference information indicating a difference in horizontal alignment between the first plurality of pixels and the second plurality of pixels; and
vertical alignment difference information indicating a difference in vertical alignment between the first plurality of pixels and the second plurality of pixels.

7. The dual-sensor digital video camera of claim 6,
wherein the alignment difference information stored on the memory medium further includes rotational alignment difference information indicating a difference in rotational alignment between the first plurality of pixels and the second plurality of pixels.

8. A dual-sensor digital video camera comprising:
a panchromatic sensor;
a color filter array (CFA) sensor including a low-pass filter; and
a beam splitter;
wherein the beam splitter is configured to split a beam of light into a first beam directed to the panchromatic sensor and a second beam directed to the CFA sensor;
wherein the panchromatic sensor produces first image information from the first beam;
wherein the CFA sensor produces second image information from the second beam;
wherein the dual-sensor digital video camera further comprises one or more computational elements configured to produce a digital YCbCr output signal from the first image information and the second image information, wherein producing the YCbCr output signal includes:
producing a first YCbCr signal by generating a digital RGB signal from the second image information from the CFA sensor and converting the digital RGB signal to YCbCr format; and
replacing Y components of pixels of the first YCbCr signal with luminance values from pixels in the first image information from the panchromatic sensor to produce pixels of the YCbCr output signal.

9. The dual-sensor digital video camera of claim 8,
wherein the one or more computational elements are further configured to sub-sample the YCbCr output signal to YCbCr 4:2:2 format.

10. The dual-sensor digital video camera of claim 8,
wherein the beam splitter is configured to direct more light to the panchromatic sensor than to the CFA sensor.

11. The dual-sensor digital video camera of claim 8,
wherein the one or more computational elements comprise one or more of:
a processor; and/or
an FPGA.

12. The dual-sensor digital video camera of claim 8, further comprising:
a memory medium storing alignment difference information, wherein the alignment difference information indicates an alignment difference between the panchromatic sensor and the CFA sensor.

13. The dual-sensor digital video camera of claim 8,
wherein the low-pass filter of the CFA sensor reduces color aliasing; and
wherein using the first image information from the panchromatic sensor for the luminance information of the output signal results in improved image sharpness.

14. A method for producing an output signal for a digital video camera, the method comprising:
receiving first image information from a panchromatic sensor;
receiving second image information from a color filter array (CFA) sensor, wherein the CFA sensor includes a low-pass filter; and
producing a digital YCbCr output signal from the first image information and the second image information, wherein producing the YCbCr output signal includes:
producing a first YCbCr signal by generating a digital RGB signal from the second image information from the CFA sensor and converting the digital RGB signal to YCbCr format; and
replacing Y components of pixels of the first YCbCr signal with luminance values from pixels in the first image information from the panchromatic sensor to produce pixels of the YCbCr output signal.

15. The method of claim 14, further comprising: sub-sampling the YCbCr output signal to YCbCr 4:2:2 format.

16. A dual-sensor digital video camera comprising:
   a panchromatic sensor;
   a color filter array (CFA) sensor including a low-pass filter; and
   a beam splitter;
   wherein the beam splitter is configured to split a beam of light into a first beam directed to the panchromatic sensor and a second beam directed to the CFA sensor;
   wherein the panchromatic sensor produces first image information from the first beam;
   wherein the CFA sensor produces second image information from the second beam;
   wherein the dual-sensor digital video camera further comprises a memory medium storing alignment difference information indicating an alignment difference between the panchromatic sensor and the CFA sensor;
   wherein the dual-sensor digital video camera further comprises one or more computational elements configured to:
      produce digital output signals including a plurality of pixels, wherein each of the plurality of pixels includes 1) luminance information from a respective pixel generated from the first image information and 2) chrominance information from a corresponding respective pixel from the second image information, wherein in producing the digital output signals the one or more computational elements are configured to determine, from the alignment difference information, the corresponding respective pixel from the second image information.

* * * * *

UNITED STATES PATENT AND TRADEMARK OFFICE
CERTIFICATE OF CORRECTION

PATENT NO. : 7,667,762 B2 Page 1 of 1
APPLICATION NO. : 11/461635
DATED : February 23, 2010
INVENTOR(S) : Michael V. Jenkins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Seventh Day of December, 2010

David J. Kappos
*Director of the United States Patent and Trademark Office*